June 22, 1971  H. VISSERS  3,586,573
APPARATUSES FOR MAKING REINFORCED PLATES OF SYNTHETIC RESIN
Filed Oct. 20, 1969  2 Sheets-Sheet 1
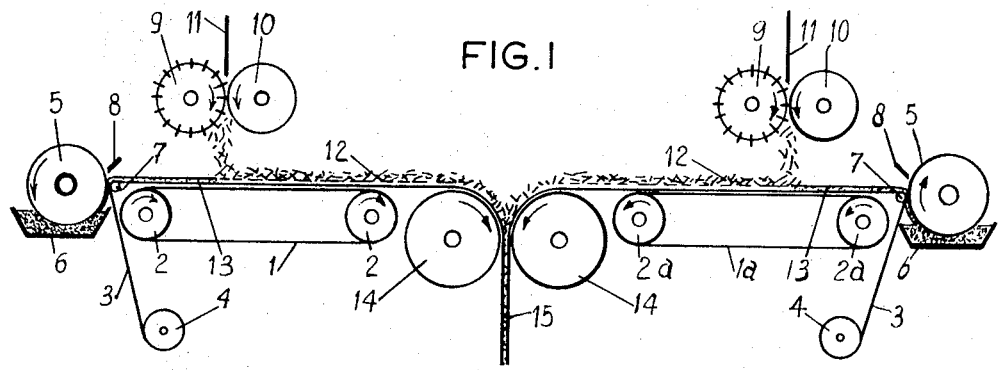
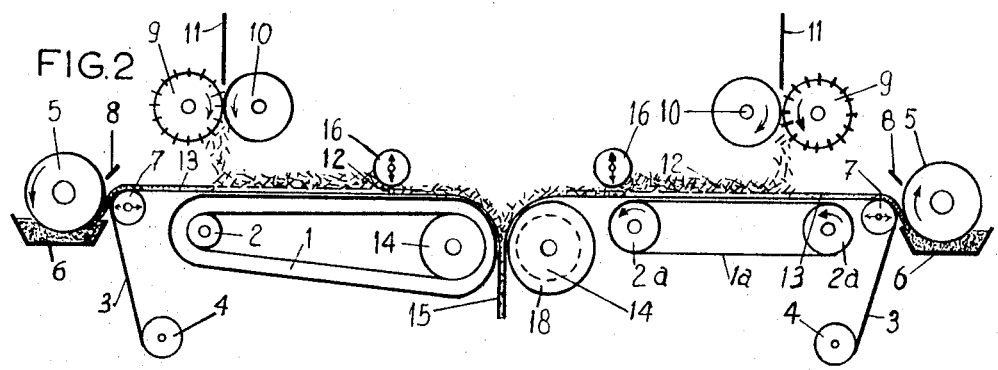
INVENTOR
HERBERT VISSERS
ATTORNEYS June 22, 1971  H. VISSERS  3,586,573
APPARATUSES FOR MAKING REINFORCED PLATES OF SYNTHETIC RESIN
Filed Oct. 20, 1969  2 Sheets-Sheet 2

INVENTOR
HERBERT VISSERS
BY
ATTORNEYS

United States Patent Office 3,586,573
Patented June 22, 1971

3,586,573
APPARATUSES FOR MAKING REINFORCED
PLATES OF SYNTHETIC RESIN
Herbert Vissers, Nieuw-Vennep, Netherlands, assignor to
Landbouwwerktuigen- en Machinefabriek H. Vissers
N.V., Nieuw-Vennep, Netherlands
Continuation-in-part of abandoned application Ser. No.
584,524, Oct. 5, 1966. This application Oct. 20, 1969,
Ser. No. 867,854
Claims priority, application Netherlands, Oct. 19, 1965,
6513483; Feb. 4, 1966, 6601422; May 13, 1966, 6606571
Int. Cl. B29j 5/08; D04h 1/16
U.S. Cl. 156—372                                    14 Claims

ABSTRACT OF THE DISCLOSURE

An apparatus for making a reinforced plate of synthetic resin, essentially comprising two conveyor belts for supporting each a strip of foil, said conveyor belts each being associated with foil supply and foil guide means, means for applying a layer of liquid resin on the foil and means for depositing pieces of glass fibre on the liquid resin, and being mounted for feeding the strips of foil together with the layers of resin and glass fibre pieces thereon, in a converging manner towards a nip between two co-operating compression rolls where the two strips of foil are brought together with the layers of liquid resin and glass fibre pieces therebetween and the composite strip thus formed is compressed to complete the reinforced plate of synthetic resin. The two conveyor belts are substantially in the same plane whilst the nip between the two compression rolls is perpendicular to that plane. Special embodiments comprise the arrangement of pressure members for pre-compressing the layers of resin and glass fibre pieces on the foil supported by each conveyor belt, special arrangements of the conveyor belts and additional means for feeding a third strip of foil between the two other strips into the nip between said compression rolls.

---

Figure 3:
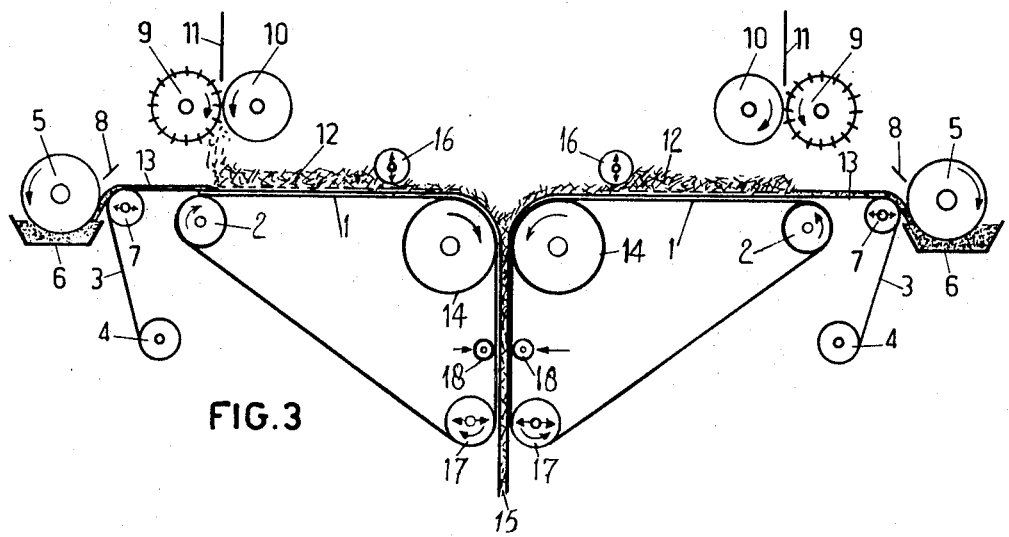

This application is a continuation-in-part of my application Ser. No. 584,524, filed Oct. 5, 1966, now abandoned.

This invention relates to the manufacture of reinforced plates of synthetic resin and more specifically to an apparatus for making such plates which comprises a special and advantageous arrangement of conveyor means and compression means.

In making reinforced plates of synthetic resin, e.g. of a thermosetting resin such as a polyester resin or an epoxy resin, it has been usual to adopt a method involving the steps of applying a layer of liquid resin onto a first travelling strip of foil, depositing glass fibre pieces on the layer of liquid resin thus applied, pressing the glass fibre pieces in the liquid resin layer so as to combine them with that layer, and covering the combined layers with a second strip of foil. An apparatus for effecting such a method usually involves a conveyor belt for supporting a first strip of foil and feeding it consecutively past a series of processing stations, such stations comprising at least resin applying means, reinforcement depositing means, pressure members and means for covering the deposited layers of liquid resin and glass fibre pieces with a second strip of foil. The pressure members may comprise one or more embossed rolls for pressing the pieces of glass fibre into the layer of liquid resin so that they will not project from that layer but the pressing operation necessarily cannot be very homogeneous in this way and the embossed rolls have a great risk of getting contaminated with liquid resin. Further, the means for covering the combined layers with a second strip of foil will have as a disadvantage that air is entrapped under such foil and special means will be needed for removing such entrapped air.

It is an object of the present invention to overcome the disadvantages of known apparatuses.

A further object is to provide an apparatus for making reinforced plates of synthetic resin which will proceed smoothly and which will have no difficulties in pressing glass fibre pieces into a liquid resin layer.

Still a further object is to provide an apparatus which will not have any difficulties in covering liquid resin with a second strip of foil.

A further object is to provide an apparatus for making reinforced plates of synthetic resin which may work at an economical speed and without troubles caused by liquid resin and projecting glass fibre pieces.

A still further object of the invention is to provide an apparatus for making reinforcement plates of synthetic resin, in which the plates may easily be discharged from the apparatus and stored for some time prior to further processing.

In an aspect of the invention, these objects are accomplished by an apparatus for making a reinforced plate of synthetic resin, comprising two conveyor belts mounted for supporting each of two strips of foil and for feeding said strips of foil in a converging manner towards a nip between two co-operating compression rolls, the upper parts of said two conveyor belts being substantially in the same plane whilst the nip between said compression rolls is substantially perpendicular to that plane, a pair of foil supply means for supplying each of two strips of foil to said conveyor belts and a pair of foil guide means each located adjacent to one of said conveyor belts for guiding the strips of foil supplied to said conveyor belts by said foil supply means, a pair of resin applying means each located adjacent to one of said foil guide means for depositing a layer of liquid resin on one face of said strips of foil guided by said foil guide means and supported by said conveyor belts, and a pair of reinforcement applying means each arranged above one of said conveyor belts for depositing pieces of glass fibre on a layer of liquid resin and a strip of foil supported by each of said conveyor belts, said two co-operating compression rolls being mounted for bringing said two strips of foil fed by said conveyor belts into confronting relationship with each other with the layers of liquid resin and glass fibre pieces therebetween and for subjecting the composite strip thus formed to compression to complete the reinforced plate of synthetic resin.

Further characteristics of the invention will be apparent from the following detailed description thereof.

In order that the invention may be more clearly understood and more easily carried into effect some embodiments of the invented apparatus will now be described with reference to the accompanying drawings in which FIGS. 1 to 4 each illustrate a somewhat different form of apparatus.

The apparatus shown in FIG. 1 comprises two conveyor belts 1 and 1a, travelling over terminal rollers 2 and 2a, each conveyor belt feeding and supporting a strip of foil 3 coming from a supply roll 4. A resin applying roll 5 is located adjacent each of the conveyor belts 1 and 1a and dips into a receptacle 6 containing liquid resin. Each strip of foil 3 is guided over a roll 7 located a small distance away from the roll 5, so that the strip of foil 3 takes up resin from the roll 5. The thickness of the layer of resin transferred to the strip of foil 3 is determined by a doctor blade 8, the position of which is preferably adjustable so as to allow a predetermined thickness of resin to remain on the roll 5. The speed of rotation of the roll 5 is adjusted to the travelling speed of the strip of foil 3.

Above each of the conveyor-belts 1 and 1a is arranged a cutting roll 9 which co-operates with a counter-roll 10. Glass threads 11 are fed between the rolls 9 and 10 over that width of the strips of foil 3 to which synthetic resin material has been applied, said threads being cut by the cutting roll 9 into short pieces of glass fibre, which fall down and are deposited on the resin layer 13 to form a fibre layer 12 of reinforcing material thereon. Both layers 12 and 13 with the underlying strips of foil 3 then converge towards a nip between a pair of compression rolls 14 and are brought into confronting relationship with each other to form a composite strip. This strip is passed between the pair of rolls 14 which subject it to compression so as to produce a reinforced synthetic resin plate 15. Provided that the layers 13 of liquid synthetic resin of the strips of foil 3 are of sufficient thickness, the glass fibres in the reinforced plate 15 will be impregnated uniformly with said resin. If required, however, an additional quantity of resin may be deposited on each of the fibre layers 12.

In the embodiment shown in FIG. 2 the thickness of the layers of resin 13 transferred to the strips of foil 3 is determined by the width of the slots between the resin applying rolls 5 and the guide rolls 7, the position of latter being adjustable in the direction of the arrows for varying the width of the slots. The doctor blades 8, which may be urged over their whole width against the resin applying rolls 5, scrape excess resin from said rolls 5, so that resin layers 13 are produced on the strips of foil 3 of uniform thickness over the whole width of those strips of foil. The fibre layers 12 are then formed on the resin layers 13 by depositing glass fibres thereon and are individually compressed by rolls 16, or other pressure members, the position of which can be adjusted vertically, and which pre-compress the resin layer and the fibres which take up a substantially horizontal position. The two strips of foil 3 with their associated layers 12 and 13 are then brought into confronting relationship with each other and the thus formed composite strip is compressed by the rolls 14, into a reinforced synthetic resin plate 15.

In addition to an up and down movement the pressure rolls 16 may also perform a horizontal reciprocating movement in such a manner that the rolls 16 in the operative position, move together with the layers 12.

The compression rolls 14 may consist of resiliently compressible material or be provided with an outer layer 18 of such material as shown in the right hand part of FIG. 2. With this arrangement, a flat plane is obtained at the operative part of the circumference of the rolls, so that the pressure zone between the rolls 14 is extended. For the same purpose, each conveyor-belt 1 may consist of resiliently compressible material e.g. foamed rubber or foamed plastics and travel over its pressure roll 14 as shown in the left hand part of FIG. 2.

The embodiment according to FIG. 3 differs from that of FIG. 2 by the fact that the conveyor-belts 1 are endless and travel over the pressure rolls 14, and also over guide rolls 17 located at a lower level so that the zone for compressing the composite strip is extended. Furthermore, the distance between the guide rolls 17 can be adjusted as can be clearly seen from the pairs of arrows shown in the rolls 17 in FIG. 3. The compressing action may be further increased by a pair of co-operating pressure members in the form of rolls 21.

Figure 4:
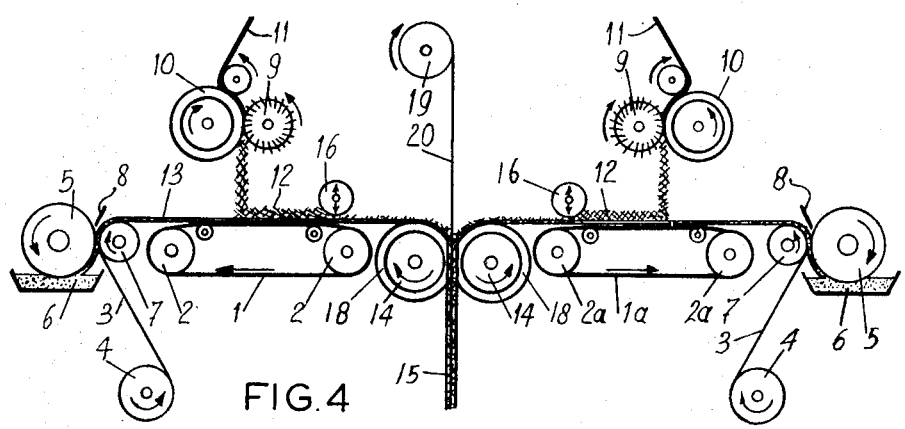

In the apparatus shown in FIG. 4, means in the form of a supply roll 19 arranged above the pair of compression rolls 14 are provided for feeding a strip of foil 20 into the nip of the rolls 14. The strip of foil 20 is fed between the strips of foil 3 and layers 12 and 13 so that the rolls 14 form the layers 12, the layers 13 and the intermediate strip of foil 20 into a composite strip and compress that strip to form a finished reinforced plate.

As will be appreciated from the drawings, the upper parts of the two conveyor belts 1 and 1a are substantially in the same plane whereas the nip between the compression rolls 14 is substantially perpendicular to that plane.

The product made by the apparatuses of FIGS. 1, 2 and 3 is a reinforced plate of synthetic resin which may immediately be converted into a final cured product but which also, by way of alternative, may be stored for later use. Such storage may conveniently be effected by cutting the plate to sheets and piling up such sheets to form a stack, the strips of foil in the sheets thereby preventing them to adhere to each other. During storage, the resin will rapidly thicken or gelify to reach a more or less solid state. Later on, the strips of foil may be removed and the plate or sheets or smaller pieces thereof may be introduced in a mould and subjected to heat and pressure therein in order to finally cure the resin and to form shaped articles.

The product made by the apparatus of FIG. 4 is a double reinforced plate of synthetic resin which may be converted or stored in the same way as the product of FIGS. 1, 2 and 3 except for the fact that it can easily be separated into two single plates or sheets just prior to introduction into a mould.

While in the foregoing specification this invention has been described in relation to preferred embodiments thereof and many details have been set forth for purpose of illustration, it will be apparent to those skilled in the art that the invention is susceptible to other embodiments and that many of the details set forth herein can be varied without departing from the basic principles of the invention.

What is claimed is:

1. Apparatus for making a reinforced plate of synthetic resin, comprising;
    a pair of cooperating compression rolls mounted for rotation about horizontal axes and defining a nip between said rolls;
    a pair of conveyor belts, each having an elongate substantially horizontal upper flight portion, said upper flight portions being disposed substantially in a common plane which lies above and tangentially of said compression rolls, whereby to define two conveying paths originating at regions remote from said compression rolls and extending horizontally therefrom toward each other and then substantially vertically downwardly to said nip;
    a pair of foil supply means, one for each conveying path;
    a pair of foil guide means, each located adjacent a respective one of said regions for guiding a strip of foil from a respective one of said foil supply means onto a respective one of said conveying paths;
    means for driving said conveying belts and said compression rolls to advance said strips of foil along said conveying paths as aforesaid to bring said strips of foil into close face-to-face proximity at said nip;
    a pair of resin applying means, each located adjacent one of said foil guide means, for depositing layers of liquid resin onto those faces of the strips which are brought into face-to-face proximity at said nip;
    a pair of reinforcement applying means, each arranged above one of said upper flight portions for depositing pieces of glass fiber on a respecive layer of liquid resin; and
    said compression rolls being mounted so that said strips with their layers of liquid resin and glass fibers are brought together and compressed at said nip to form a reinforced plate of synthetic resin.

2. The apparatus of claim 1, in which each of said resin applying means comprises a resin applying roll dipping into a receptacle for liquid resin.

3. The apparatus of claim 2, in which each of said resin applying rolls is provided with a doctor blade for adjusting the thickness of the layer of liquid resin being deposited on a strip of foil.

4. The apparatus of claim 1, in which each of said reinforcement applying means comprises a cutting roll and a counter-roll co-operating therewith for cutting into pieces a glass thread fed to these rolls and depositing thus formed pieces of glass fibre onto a resin layer and a strip of foil supported by each of said conveyor belts.

5. The apparatus as claimed in claim 1, further comprising a pair of pressure members each located above one of said conveyor belts between said reinforcement applying means and said compression rolls for pre-compressing a layer of liquid resin and glass fibre pieces on a strip of foil supported by each of said conveyor belts.

6. The apparatus as claimed in claim 5, in which each of said pressure members is mounted for movement towards and away from the conveyor belt above which it is located.

7. The apparatus as claimed in claim 5, in which each of said two conveyor belts is made from resiliently compressible material and travels over one of said compression rolls.

8. The apparatus as claimed in claim 5, in which each of said two co-operating compression rolls has at least its outer layer made from resiliently compressible material.

9. The apparatus as claimed in claim 5, in which means are provided for adjusting the mutual distance between each foil guide means and its associated resin applying means.

10. The apparatus as claimed in claim 5, in which each of said conveyor belts is travelling over one of said compression rolls and over a pair of co-operating guide rolls located below said compression rolls.

11. The apparatus as claimed in claim 10, in which means are provided for adjusting the distance between said pair of co-operating guide rolls located below said co-operating compression rolls.

12. The apparatus as claimed in claim 10, in which a pair of co-operating pressure members is arranged between said pair of co-operating compression rolls and said pair of co-operating guide rolls therebelow for further compressing the layers of material passing between them.

13. The apparatus as claimed in claim 5, further comprising means for feeding a separate strip of foil into the nip between said two co-operating compression rolls between the two strips of foil fed by said conveyor belts.

14. Apparatus according to claim 1 wherein each foil supply means is disposed below said common plane and each said foil guide means comprises a member over which a corresponding foil strip is trained so that each foil strip abruptly changes direction thereat, and wherein each resin applying means comprises a rotating roll operating in a liquid resin bath and a doctor blade for transferring resin from the rotating roll to the foil strip, each rotating roll being disposed in horizontally spaced parallel relation to a respective member and each doctor blade being disposed therebetween.

References Cited

UNITED STATES PATENTS

| | | | |
|---|---|---|---|
| 2,406,801 | 9/1946 | Byers | 156—369X |
| 2,903,387 | 9/1959 | Wade | 264—115X |
| 3,030,245 | 4/1962 | Greiner et al. | 156—372X |
| 3,137,601 | 6/1964 | Menzer | 156—276X |
| 3,271,215 | 9/1966 | Hoffman | 156—276X |
| 3,383,442 | 5/1968 | Mountain | 156—372X |

SAMUEL W. ENGLE, Primary Examiner

J. J. DEVITT, Assistant Examiner

U.S. Cl. X.R.

156—370; 264—112